United States Patent [19]

Kokawa et al.

[11] Patent Number: 5,200,616
[45] Date of Patent: Apr. 6, 1993

[54] ENVIRONMENT CONTROLLABLE SCANNING PROBE MICROSCOPE

[75] Inventors: Ryohei Kokawa, Hadano; Osamu Nishikawa, Tokyo; Masahiko Tomitori, Yokohama, all of Japan

[73] Assignee: Shimadzu Corporation, Kyoto, Japan

[21] Appl. No.: 810,159

[22] Filed: Dec. 19, 1991

[30] Foreign Application Priority Data

Dec. 20, 1990 [JP] Japan .................................. 2-404211

[51] Int. Cl.⁵ .............................................. H01J 37/18
[52] U.S. Cl. ................................. 250/306; 250/441.11
[58] Field of Search ..................... 250/306, 307, 441.11

[56] References Cited

U.S. PATENT DOCUMENTS

| | | | |
|---|---|---|---|
| 4,362,937 | 12/1982 | Nakajima | 250/306 |
| 4,618,767 | 1/1986 | Smith et al. | 250/306 |
| 4,992,660 | 2/1991 | Kobayashi | 250/307 |
| 5,029,249 | 7/1991 | Ohtaka | 250/306 |
| 5,061,850 | 10/1991 | Kelly et al. | 250/306 |

FOREIGN PATENT DOCUMENTS

| | | | |
|---|---|---|---|
| 61-220620 | 9/1986 | Japan . | |
| 63-81941 | 4/1988 | Japan . | |
| 1213947 | 8/1989 | Japan | 250/306 |
| 2134502 | 5/1990 | Japan | 250/306 |

OTHER PUBLICATIONS

Imaging of Biomolecules with the Scanning Tunneling Microscope: Problems and Prospects, M. Salmeron, et al.

Primary Examiner—Jack I. Berman
Assistant Examiner—Kiet T. Nguyen
Attorney, Agent, or Firm—Oliff & Berridge

[57] ABSTRACT

An environment controllable scanning probe microscope (SPM), such as a scanning tunneling microscope (STM), atomic force microscope (AFM), etc., in which the gaseous environment of the sample during the observation is controllable. That is, the gas surrounding the sample can be replaced to a desired one and the pressure can be set to a desired value. The SPM is suited for observing biological samples because biological samples may deteriorate under a reduced pressure and the surface topography at such high magnification is vulnerable to contamination from the environment.

11 Claims, 7 Drawing Sheets

ENVIRONMENT CONTROLLABLE SCANNING PROBE MICROSCOPE

The present invention relates to scanning probe microscopes (SPM or SXM), such as a scanning tunneling microscope (STM), atomic force microscope (AFM), laser force microscope (LFM), magnetic force microscope (MFM), scanning ion-conductance microscope (SICM), scanning capacitance microscope (SCM), etc., which generally use a probe placed in the proximity of a sample surface to trace the surface topography of the sample while the probe is scanned.

BACKGROUND OF THE INVENTION

In a scanning tunneling microscope (STM), which is a typical SPM, a surface topography of a sample is observed using a needle-like probe called "tip" whose apex is placed in the proximity of the sample surface (the gap between the apex of the tip and the surface of the sample is of the order of 1 nm = $10^{-9}$ m). The tip is fixed to a tip scanning driver which moves the apex of the tip in the x, y and z directions (where z is the direction parallel to the tip) using piezoelectric actuators. A certain voltage (about $\pm 0.1-3$ V) is applied between the tip and the sample to cause a tunneling current to flow between them. While the tip is scanned through the x-y plane, the tunneling current is maintained constant by properly moving the tip in the z direction, whereby the surface topography is obtained. The resolution of the STM can be up to the dimension of atoms.

Conventional STMs are mainly used for observing non-biological samples such as metals, semiconductors, etc., in which case the sample is placed in a highly evacuated chamber and the surface is cleaned by heating the sample to a high temperature or a cleaved new surface is produced.

SUMMARY OF THE INVENTION

When biological samples such as proteins or DNA are placed in a vacuum, the biological samples may deform from that under normal pressure. Thus, so far, biological samples are observed by a atmospheric-observation type STM which does not use a vacuum chamber but the sample is observed in the open air.

When the sample and the tip are placed in the open air, however, contaminants floating in the air can be adsorbed on the surface of the sample and on the tip. Since the resolution (and magnification) of an STM is generally very high, the observed surface topography does not represent the real surface of the sample if contaminants are adsorbed on the surface. If the apex of the tip is contaminated, the surface topography obtained is distorted in the entire observation range. Another problem in observing biological samples is an aggregation of the biological samples in a vacuum. These problems generally arise when biological samples are to be observed by SPMs in which a tiny probe is placed in the proximity of the sample surface and the sample is observed with very high resolution (and high magnification).

The present invention addresses the problem, and provides an environment controllable SPM (including STM), that is, the gas surrounding the sample and its pressure as an environment of the sample is controllable, by which a sample can be observed under normal pressure (or under any desired pressure) and without contamination from the environment.

A scanning probe microscope according to the present invention comprises:

a gas-tight main chamber;

a base for mounting a sample in the main chamber;

a probe provided in the main chamber for tracing the surface of sample;

discharging means for discharging a first gas from the main chamber; and charging means for charging a second gas or gases into the main chamber.

When the scanning probe microscope (SPM) is a scanning tunneling microscope (STM), the probe mentioned above includes a tip that causes a tunneling current between itself and the sample, and a tip driver for moving the apex of the tip three dimensionally in relation to the sample. When the SPM is an atomic force microscope (AFM), the probe mentioned above includes a tip for tracing the sample surface (where the apex of the tip is repulsed from the sample surface by the van der Waals force or the atomic force) and a resilient cantilever for holding the tip. The vertical movement of the cantilever is detected by a laser light, by a tunneling tip, or other means. Since no electrical current flows through the sample, the AFM is suited for observing biological samples.

The discharging means can be a pump or a series of pumps, and the charging means can be a gas container containing the second gas and connected to the main chamber. After the first gas (normally the atmospheric air, but in some cases an already replaced gas) in the main chamber is evacuated by the discharging means, the second gas or gases (a replace gas) is introduced in the main chamber by the charging means to a desired pressure, whereby the gaseous environment in the main chamber is arbitrarily controlled. A gas cleaner may be provided between the gas container and the main chamber.

Instead of completely evacuating the main chamber once, the discharging means and the charging means can be simultaneously operated to replace the gas if the sample in the main chamber may deteriorate due to a reduced pressure.

It is more desirable to provide a sample chamber connected to the main chamber (with a valve between the main chamber and the sample chamber and another valve between the sample chamber and the outside atmosphere) if the sample cannot endure temporary vacuum during the gas replacement. In this case, both the discharging means and the charging means are also connected to the sample chamber to replace the gas in the sample chamber.

The SPM (especially, STM or AFM) according to the present invention is suited for (but not limited to) observing a biological sample which may deform in a vacuum. Further, contaminations of the sample or the probe (tip) from the environment are avoided in the SPM of the present invention, whereby the observed surface topography reflects the real shape of the sample.

BRIEF DESCRIPTION OF THE ATTACHED DRAWINGS

DETAILED DESCRIPTION OF A PREFERRED EMBODIMENT

Figure 1:
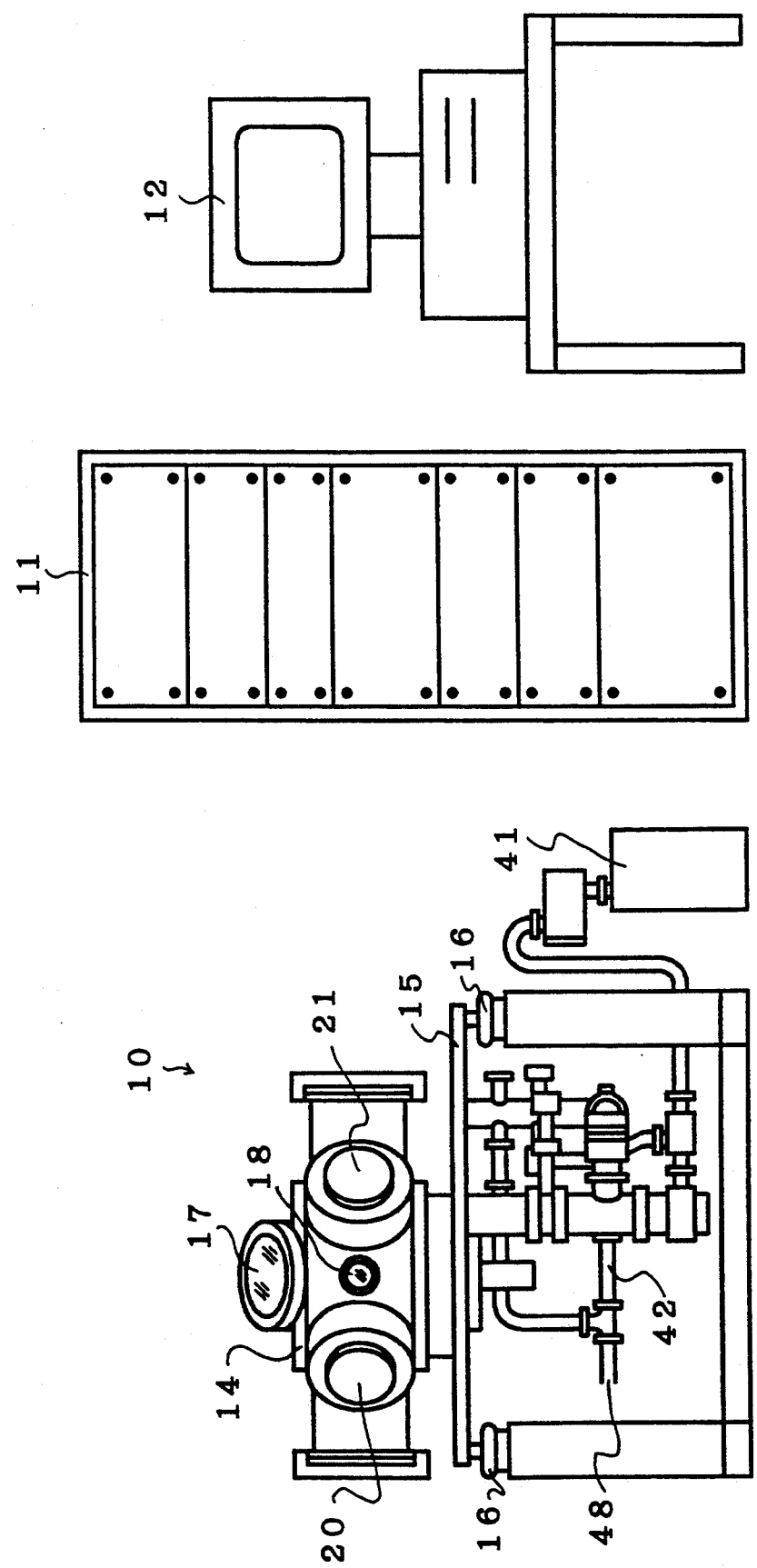
FIG. 1 is a front view of an environment controllable STM embodying the present invention.

An environment controllable STM embodying the present invention is shown in FIG. 1. The STM system is constructed of an observation section 10, a controller section 11 and a console section 12. In the observation section 10, a main chamber 14 is mounted on a table 15 suspended by air suspensions 16. The main chamber 14 is a gas-tight chamber having several see-through windows 17, 18 (two other windows are provided on the top of the main chamber 14), and two operation apertures 20, 21.

Figure 2:
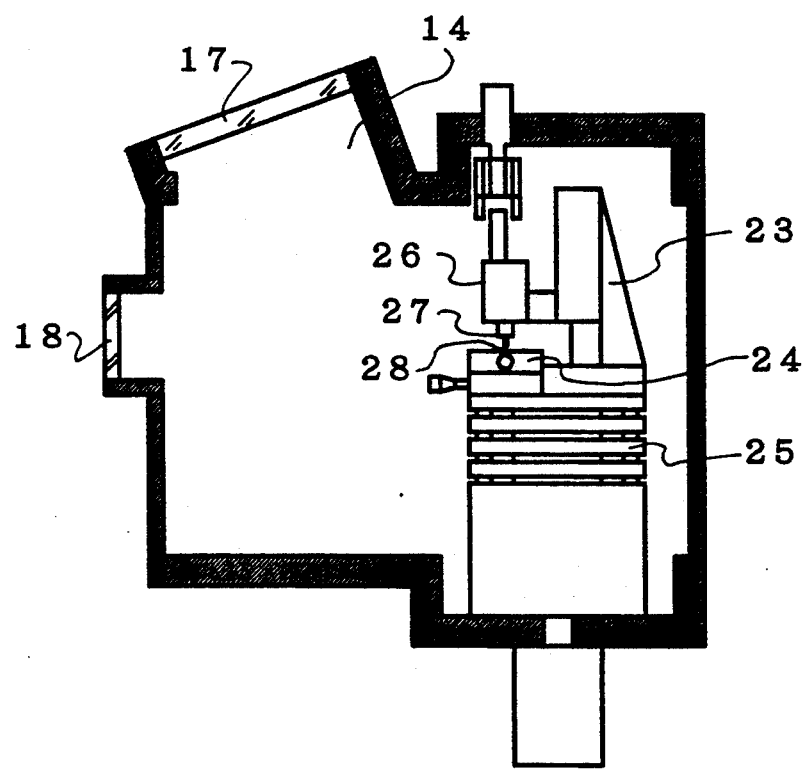
FIG. 2 is a vertical cross-sectional view of the main chamber of the STM.

A sample station 23 as shown in FIG. 2 is provided in the main chamber 14. In the sample station 23, a sample base 24 is mounted on a vibration insulator 25, and a tip driver 26 for fixing a tip 27 is placed above the sample base 24. Two micrometers for moving the sample in the x and y directions are installed in the sample base 24 and a z direction micrometer is provided for the tip driver 26, whereby the sample base 24 and the tip 27 are relatively moved to roughly locate the apex of the tip 27 on a sample 28 mounted on the sample base 24.

Figure 3:
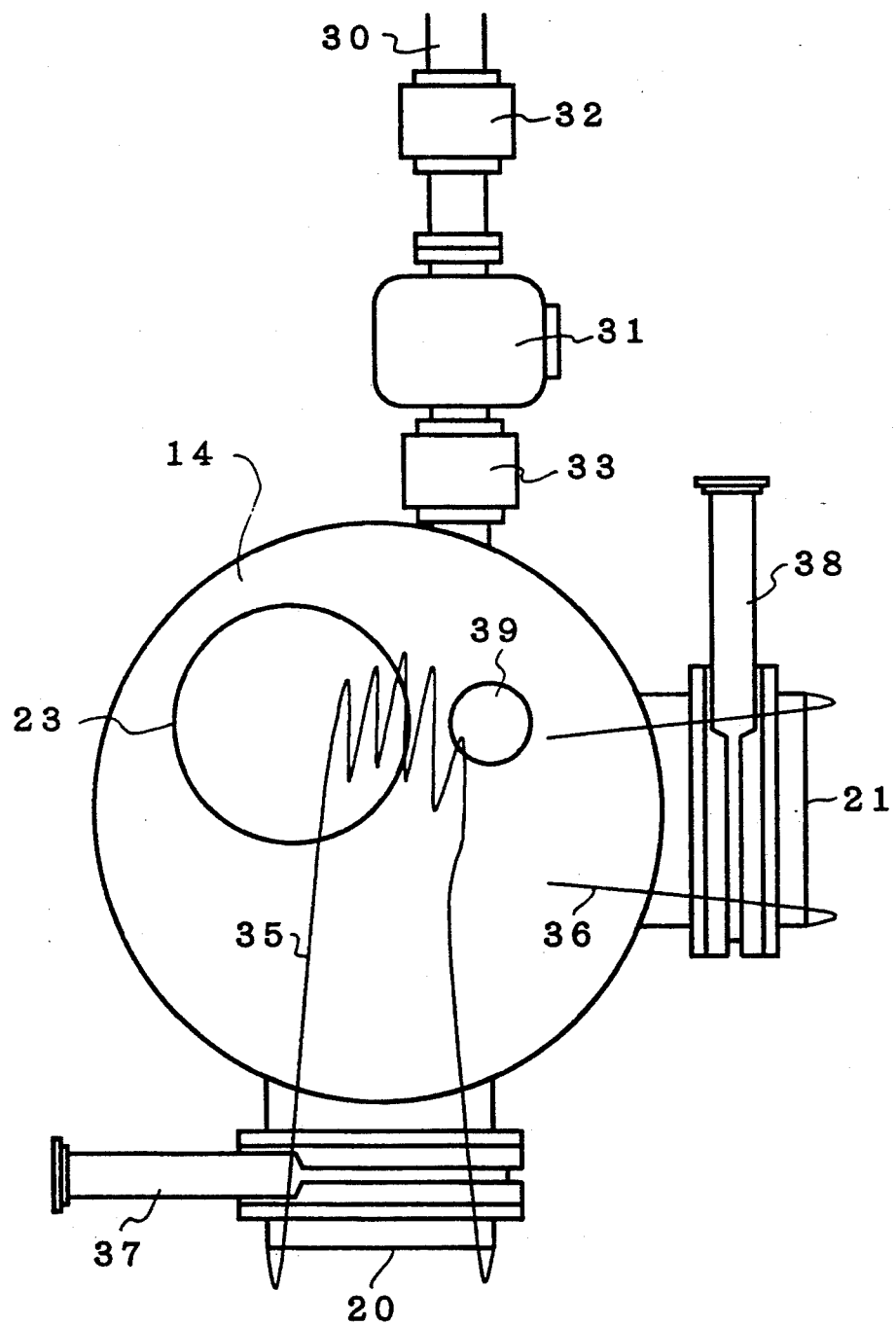
FIG. 3 is a horizontal cross-sectional view of the main chamber.

As shown in FIG. 3, a sample introduction pipe 30 having a sample chamber 31 is connected at a flank of the main chamber 14. The sample chamber 31 is isolated from the outside atmosphere by a valve 32 and from the main chamber 14 by another valve 33. A rubber glove 35, 36 is gas-tightly fixed to each of the operation apertures 20, 21, and a shutter 37, 38 is provided for each of the apertures 20, 21.

Figure 4:
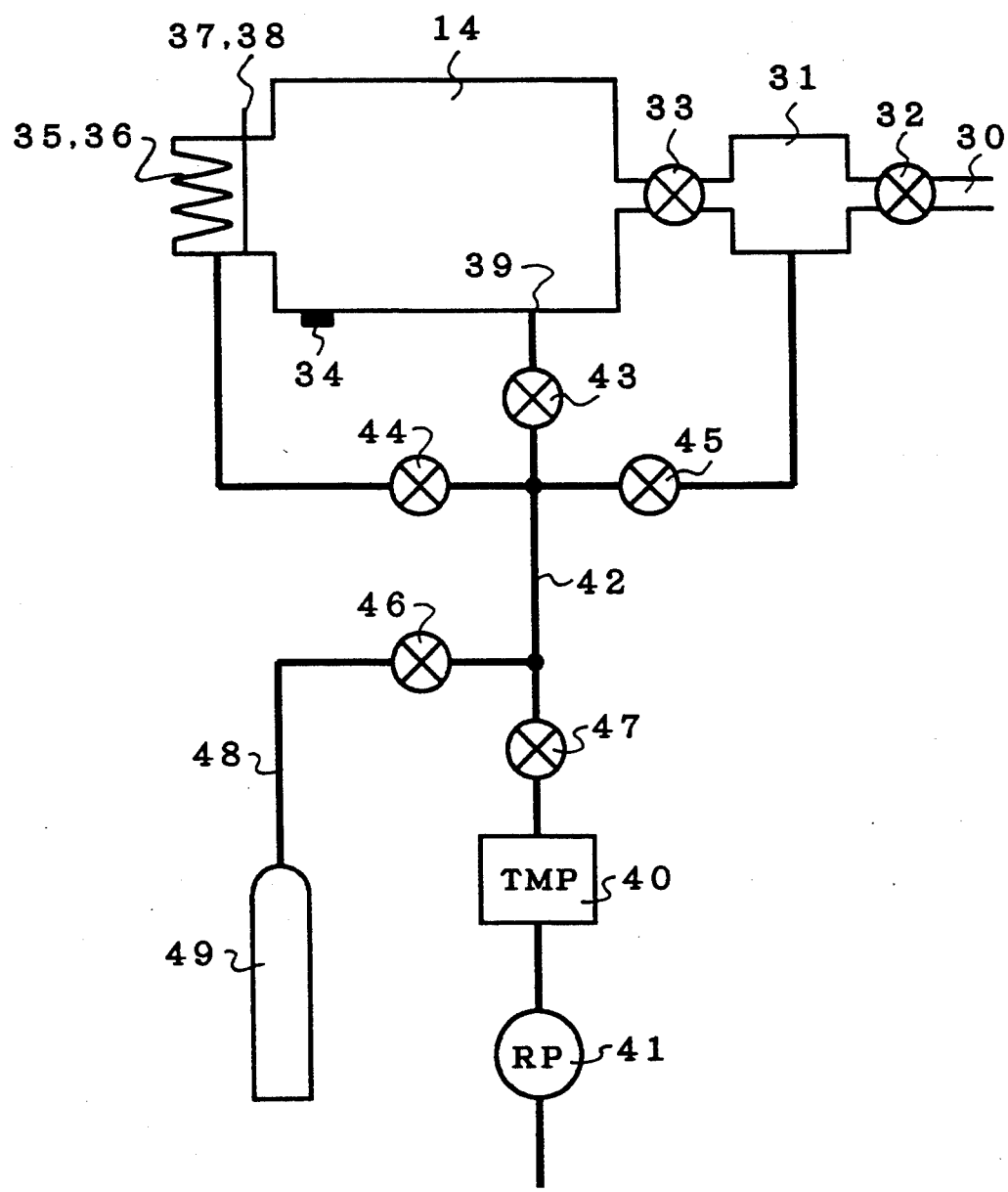
FIG. 4 is a schematic diagram of the gas system of the STM.

The gas system of the STM for replacing the gas in the main chamber 14 is provided under the table 15. As shown in FIG. 4, the gas system includes a turbo molecular pump (TMP) 40, a rotary pump (RP) 41, gas pipes 42 and five valves 43, 44, 45, 46 and 47. When the gas in the main chamber 14 is to be replaced by another gas, a gas container 49 containing the another gas (replace gas) is connected to a terminal 48 of the gas pipes 42.

Figure 5:
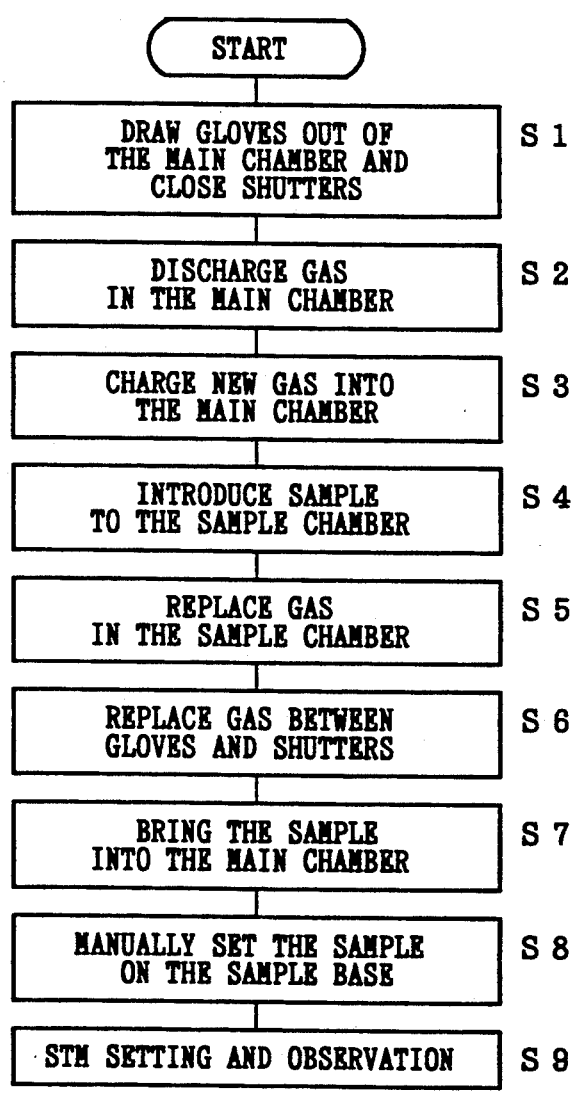
FIG. 5 is a flowchart of the operation for observing a biological sample with the STM.

The procedure in observing a biological sample is now described using the flowchart of FIG. 5. First the valve 33 is closed, and the shutters 37, 38 are closed after the gloves 35, 36 are drawn out of the main chamber 14 (step S1). Then the valves 43 and 47 are opened to discharge the atmospheric air in the main chamber 14 including contaminants through a hole 39 using the rotary pump 40 and the turbo molecular pump 41 (step S2). After the main chamber 14 is evacuated, the valve 47 to the vacuum pumps 40, 41 is closed and the valve 46 to the gas container 49 is opened to charge the replace gas into the main chamber 14 (step S3). When the pressure of the replace gas in the main chamber 14 reaches a preset value (the pressure is measured by a pressure sensor 34 provided in the main chamber 14), the valve 46 is closed. In observing biological samples, a mixture of inert gas (such as Ar, He, etc.: in some situations including this case of observing biological samples, nitrogen gas can be an inert gas) and water vapor with the pressure of 1 atm is suited. When other kinds of sample are observed, an appropriate replace gas is chosen and the pressure is set according to the object of the observation.

After the sample to be observed is introduced in the sample chamber 31 (step S4), the atmospheric air in the sample chamber 31 is replaced just in the same manner as that for the main chamber 14 using the appropriate valves 45, 47 and 46 (step S5). After the gloves 35, 36 are drawn out of the main chamber 14 and the shutters 37, 38 are closed, a small amount of atmospheric air remains in the space between the shutter and the glove. In the STM of the present embodiment, the atmospheric air is also replaced using appropriate valves 44, 47 and 46 (step S6).

When the gas in the sample chamber 31 is replaced, the valve 33 to the main chamber 14 is opened to bring the sample in the main chamber 14 (step S7), and the shutters 37, 38 are opened to allow the operator to set the sample on the sample base 24 using the gloves 35, 36 (step S8). The slanted see-through window 17 at the top of the main chamber 14 facilitate the sample setting operation. Then the x, y, and z direction micrometers are driven to locate the object point of the sample 28 under the tip 27. When the gap between the apex of the tip 27 and the sample surface reaches a preset value that allows a tunneling current, the observation by the STM starts. While the tip 27 is scanned through the x-y plane, the tunneling current flowing through the gap is maintained constant by moving the tip 27 in the z direction using the tip scanning driver 26. The position data of the apex of the tip 27 is transmitted through the controller 11 to an image processor provided in the console section 12, where the surface topography is displayed (step S9).

Figure 6:
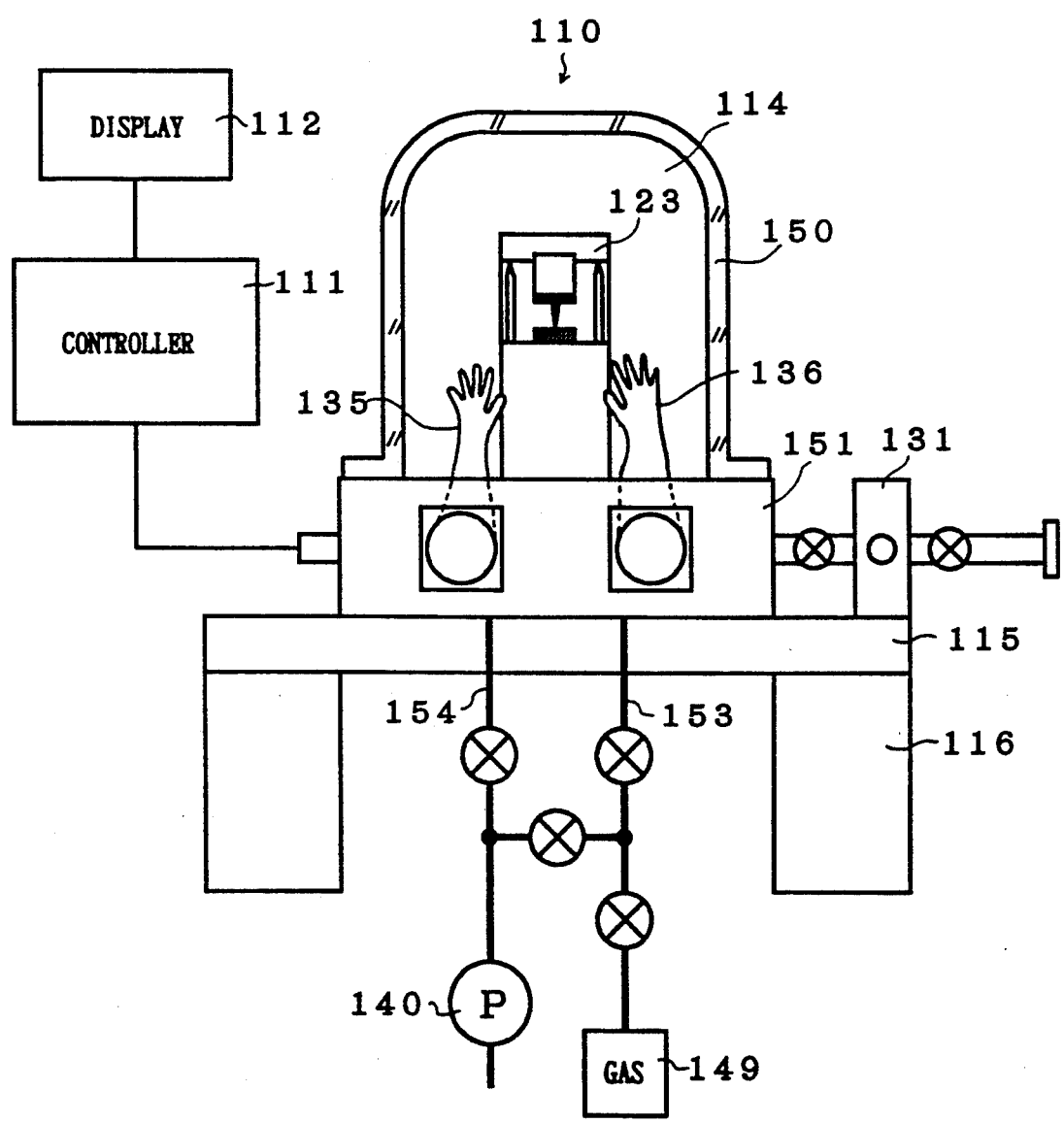
FIG. 6 is a schematic diagram of another environment controllable STM embodying the present invention.

Another embodiment of the present invention is shown in FIG. 6, in which the main chamber 114 is formed by a chamber base 151 having apertures for the gloves 135, 136 and a transparent glass case 150 mounted thereon. In the gas system, the gas discharging pipe 154 and charging pipe 153 are separately connected to the main chamber 114. Numbered elements in FIG. 6 correspond to those in FIG. 4 having the same last two digits.

Figure 7:
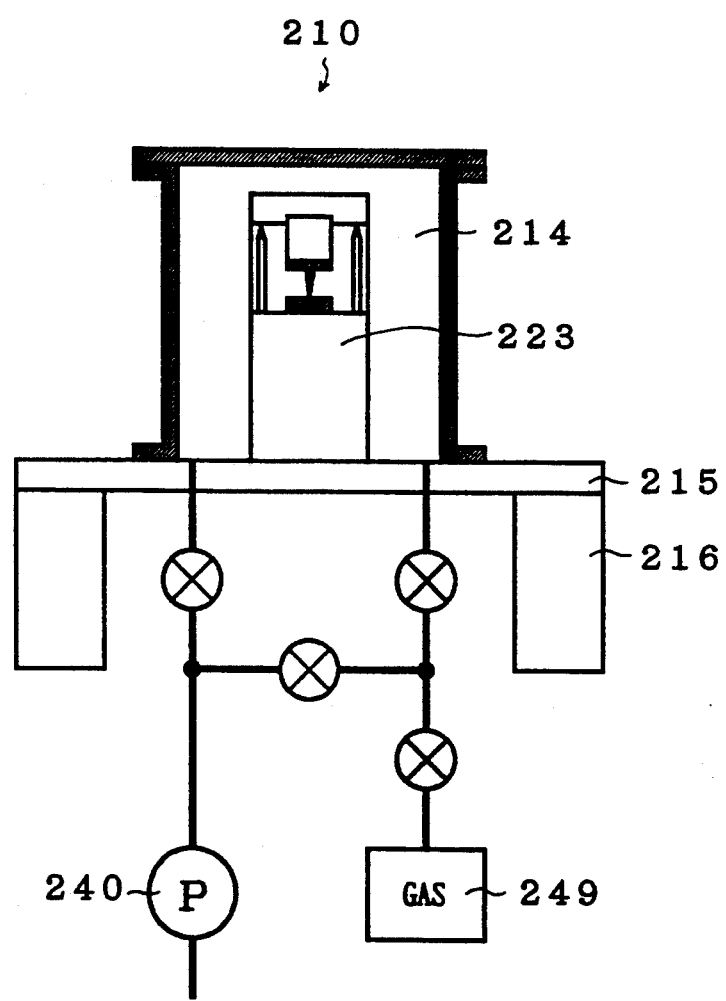
FIG. 7 is a schematic diagram of still another STM embodying the present invention.

If a sample can endure vacuum temporarily, the sample may be mounted on the sample base of the sample station 223 first before the gas in the main chamber 214 is replaced. In this case, no transparent window nor apertures for the gloves are necessary in the main chamber 214, as shown in FIG. 7. Numbered elements in FIG. 7 correspond to those in FIG. 4 having the same last two digits.

Though the forgoing description of the embodiments are made on scanning tunneling microscopes (STM) only, the present invention can be applied to any kind of scanning probe microscopes (SPM) because no specific requirement is made on the probe and its driving (scanning) mechanism. An AFM is one of the most appropriate microscope for applying the present invention, since it is suited for observing biological samples (no electrical current is needed to flow through the sample).

What is claimed is:

1. A scanning probe microscope comprising:
   a gas-tight main chamber;
   a base for mounting a sample in the main chamber;
   a probe provided in the main chamber for tracing the surface of sample;
   discharging means for discharging a first gas from the main chamber; and charging means for charging a second gas or gases into the main chamber.

2. A scanning probe microscope, as claimed in claim 1, where a sample chamber is connected to the main chamber with a valve between the main chamber and the sample chamber and another valve between the sample chamber and the outside atmosphere, and both the discharging means and the charging means are also connected to the sample chamber.

3. A scanning probe microscope, as claimed in claim 2, where the main chamber has a transparent portion, and an operation aperture equipped with a gas-tight glove for treating the sample in the main chamber and a shutter for shutting the operation aperture.

4. A scanning probe microscope, as claimed in claim 3, where both the discharging means and the charging means are further connected to the space between the shutter and the glove of the operation aperture.

5. A scanning probe microscope, as claimed in claim 4, where a pressure sensor is provided to the main chamber to fill the main chamber with the second gas at a preset pressure value.

6. A scanning tunneling microscope comprising:
   a gas-tight main chamber;
   a base for mounting a sample in the main chamber;
   a tip provided in the main chamber for causing a tunneling current between itself and the sample;
   a driver for moving the apex of the tip three dimensionally in relation to the sample;
   discharging means for discharging a first gas from the main chamber; and
   charging means for charging a second gas or gases into the main chamber.

7. A scanning tunneling microscope, as claimed in claim 6, where a sample chamber is connected to the main chamber with a valve between the main chamber and the sample chamber and another valve between the sample chamber and the outside atmosphere, and both the discharging means and the charging means are also connected to the sample chamber.

8. A scanning tunneling microscope, as claimed in claim 7, where the main chamber has a transparent portion, and an operation aperture equipped with a gas-tight glove for treating the sample in the main chamber and a shutter for shutting the operation aperture.

9. A scanning tunneling microscope, as claimed in claim 8, where both the discharging means and the charging means are further connected to the space between the shutter and the glove of the operation aperture.

10. A scanning tunneling microscope, as claimed in claim 9, where a pressure sensor is provided to the main chamber to fill the main chamber with the second gas at a preset pressure value.

11. An atomic force microscope comprising:
    a gas-tight main chamber;
    a base for mounting a sample in the main chamber;
    a probe provided in the main chamber for tracing the surface of sample;
    discharging means for discharging a first gas from the main chamber; and
    charging means for charging a second gas or gases into the main chamber.

* * * * *